United States Patent
Lisciani

(10) Patent No.: US 11,644,072 B2
(45) Date of Patent: May 9, 2023

(54) BRAKE DISC

(71) Applicant: ENDURANCE ADLER S.P.A., Rovereto (IT)

(72) Inventor: Giuseppe Lisciani, Rovereto (IT)

(73) Assignee: ENDURANCE ADLER S.P.A., Rovereto (IT)

( * ) Notice: Subject to any disclaimer, the term of this patent is extended or adjusted under 35 U.S.C. 154(b) by 145 days.

(21) Appl. No.: 17/193,847

(22) Filed: Mar. 5, 2021

(65) Prior Publication Data

US 2021/0310529 A1 Oct. 7, 2021

(30) Foreign Application Priority Data

Apr. 1, 2020 (IT) .......................... 102020000006805

(51) Int. Cl.
*F16D 65/12* (2006.01)
*F16D 65/02* (2006.01)

(52) U.S. Cl.
CPC .... *F16D 65/123* (2013.01); *F16D 2065/1392* (2013.01)

(58) Field of Classification Search
CPC ............... F16D 65/123–128; F16D 2065/1392
USPC ......................................... 188/18 A, 218 XL
See application file for complete search history.

(56) References Cited

U.S. PATENT DOCUMENTS

| | | | | |
|---|---|---|---|---|
| 4,848,521 A * | 7/1989 | Izumine | ................ | F16D 65/123 188/218 XL |
| 5,520,269 A * | 5/1996 | Yamamoto | ............ | F16D 65/123 188/218 XL |
| 6,957,726 B2 * | 10/2005 | Gehrs | ..................... | F16D 65/12 188/218 XL |
| 8,474,580 B2 * | 7/2013 | Spacek | .................. | F16D 65/12 188/26 |
| 2010/0133054 A1 * | 6/2010 | Wagner | .................. | F16D 65/12 188/218 XL |
| 2012/0097491 A1 * | 4/2012 | Yamanaka | .............. | F16D 65/12 188/218 XL |

(Continued)

FOREIGN PATENT DOCUMENTS

| | | |
|---|---|---|
| CN | 104976252 A | 10/2015 |
| CN | 109424672 A | 3/2019 |

(Continued)

OTHER PUBLICATIONS

Talian Search Report dated Dec. 21, 2020 from counterpart Italian Patent Application No. IT 202000006805.

*Primary Examiner* — Christopher P Schwartz
(74) *Attorney, Agent, or Firm* — Shuttleworth & Ingersoll, PLC; Timothy Klima

(57) ABSTRACT

Described is a brake disc, rotating about its own axis of rotation, including a brake strip, an element for supporting the brake strip and a plurality of first elements for connecting the brake strip with the supporting element which can be elastically deformed in such a way as to allow a relative movement of the brake strip with respect to the supporting element. The supporting element includes at least a first component and a second component connected to the brake strip by means of the first connecting elements. A plurality of second connecting elements of the first component and of the second component are elastically deformable in such a way as to allow a relative movement between the first component and the second component.

19 Claims, 2 Drawing Sheets

(56) References Cited

U.S. PATENT DOCUMENTS

| | | |
|---|---|---|
| 2013/0133996 A1 | 5/2013 | Iwai et al. |
| 2014/0097051 A1* | 4/2014 | Moore .................. F16D 65/123 |
| | | 188/218 XL |
| 2017/0114846 A1 | 1/2017 | Chen |
| 2017/0198774 A1 | 7/2017 | Wen |
| 2018/0094680 A1* | 4/2018 | Nakatsuji ................ F16D 65/12 |

FOREIGN PATENT DOCUMENTS

| | | |
|---|---|---|
| EP | 2128476 A1 | 12/2009 |
| TW | M473984 U | 3/2014 |

\* cited by examiner

BRAKE DISC

This application claims priority to Italian Patent Application 102020000006805 filed Apr. 1, 2020, the entirety of which is incorporated by reference herein.

BACKGROUND OF THE INVENTION

This invention relates to a brake disc.

More specifically, the brake disc according to this invention is preferably for use by bicycles or motorcycles with two or more wheels, without thereby limiting the scope of the invention.

SUMMARY OF THE INVENTION

As is known from the prior art, the brake strip of a brake disc is subjected to a high level of heating during braking and is particularly sensitive to thermal expansion due to its thickness, which is to be considered reduced in relation to the considerable extension of its surface.

This heating may induce deformations of the brake strip both in the diametric direction and in the axial direction of the disc, creating considerable problems in the mechanics of the braking.

To overcome these problems, which are especially evident in the systems of motorcycles with high-performance and for sports use, use is made of the so-called "floating" and "semi-floating" brake discs which usually consist of an internal support, an external brake strip and an elastic system for attaching the support with the brake strip which allows a relative movement, or misalignment, of the brake strip with respect to the support in the diametric direction or in the axial direction or in both directions.

In order to increase the compliance of the connection between the brake strip and the support, the need is felt of making a brake disc, rotating about its own axis of rotation, comprising a brake strip, an element for supporting the brake strip and a plurality of first elements for connecting the brake strip with the supporting element, which can be elastically deformed in such a way as to allow a relative movement of the brake strip with respect to the supporting element.

The supporting element comprises at least a first component, designed to be connected to a hub of a rotary element, and at least a second component connected to the brake strip by means of the first connecting elements.

A plurality of second connecting elements of the first component and of the second component are elastically deformable in such a way as to allow a relative movement between the first component and the second component.

Advantageously, the elastic connections are divided into at least two groups connected in series, the compliance of the connections is doubled in a radial direction and quadrupled in a direction parallel to the axis of rotation, under equal conditions of compliance of all the elastic connections.

BRIEF DESCRIPTION OF THE DRAWINGS

The features of the brake dis according to the invention will become more apparent from the following detailed description of a preferred, non-limiting embodiment of it, illustrated by way of example in the accompanying drawings, in which.

DESCRIPTION OF THE PREFERRED EMBODIMENTS

Figure 1:
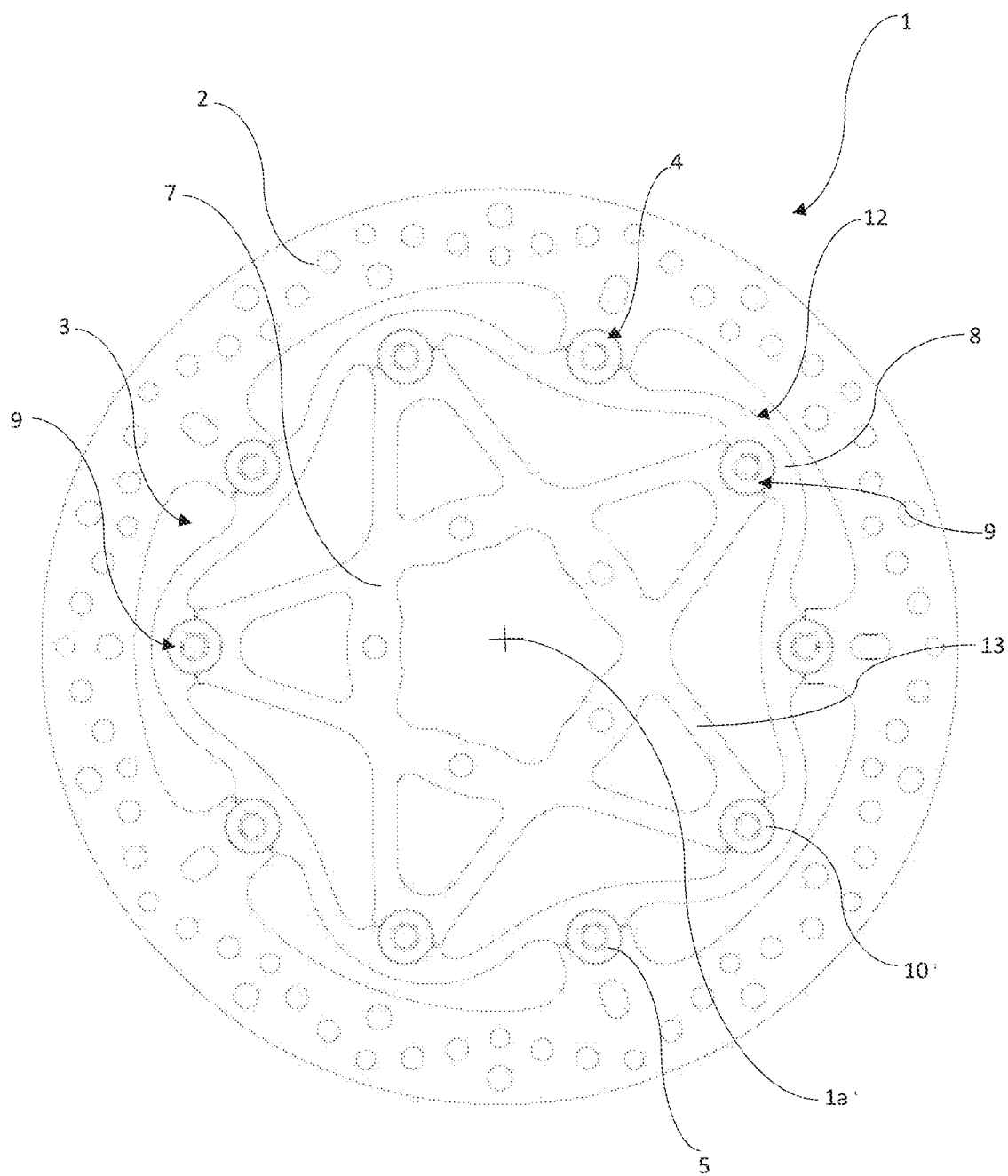
FIG. 1 is a schematic front view of a first embodiment of a brake disc according to the invention.
Figure 2:
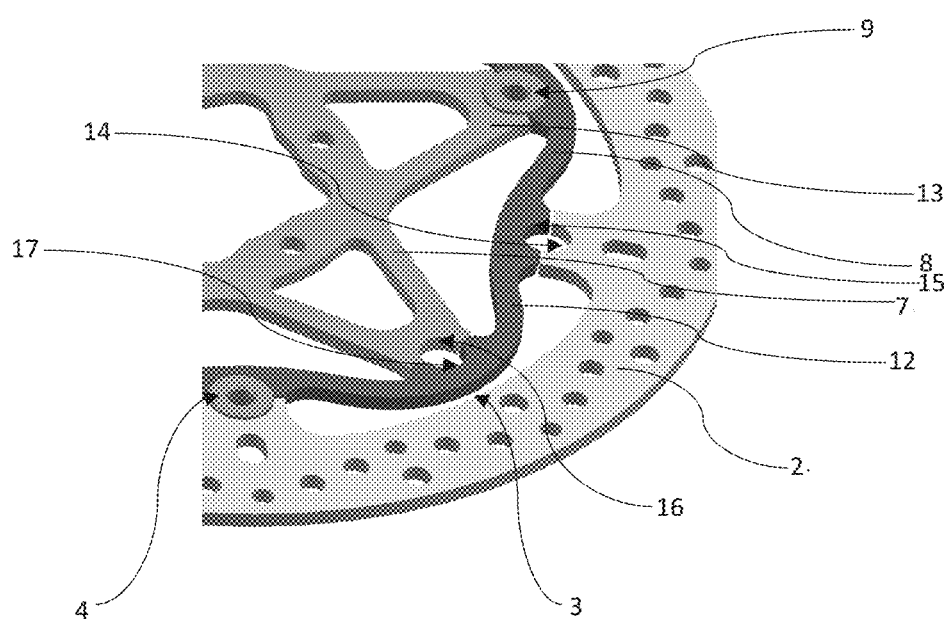
FIG. 2 is a schematic perspective view of a detail of the brake disc of FIG. 1, with some parts cut away to better illustrate others.

With reference to the accompanying drawings, the numeral 1 denotes a brake disc according to the invention.

The brake disc 1 rotates about its axis of rotation 1a.

The brake disc 1 comprises a brake strip 2.

In the embodiment described, the brake strip 2 of the brake disc 1 is an annular strip having a thickness defined by the distance between end faces, preferably parallel, defining the zones of contact with friction means (not illustrated) for braking or the transmission of a torque by friction.

It should be noted that the brake strip 2 may have a specific shape, such as, for example, in the shape of "waves".

The brake disc 1 comprises an element 3 for supporting the brake strip 2. The supporting element 3 is configured to be keyed, centrally, to the hub of a rotary element or to a wheel of the vehicle (bicycle or motorcycle or vehicle of other types not illustrated).

The brake disc 1 comprises a plurality of first elements 4 for connecting the brake strip 2 with the supporting element 3.

The brake strip 2 has a plurality of seats 14 each of which partly houses a respective first connecting element 4.

The first connecting elements 4 are elastically deformable in such a way as to allow a relative movement of the brake strip 2 relative to the supporting element 3.

In that sense, the brake disc 1 according to the invention is a so-called "floating" brake disc.

In a preferred embodiment, as illustrated, each first connecting element 4 comprises a cylindrical pawl 5.

According to the invention, the supporting element 3 comprises at least a first component 7 and a second component 8.

A plurality of second connecting elements 9 of the first component 7 and of the second component 8 are elastically deformable in such a way as to allow a relative movement between the first component 7 and the second component 8.

The first component 7 has a plurality of seats 16 each of which partly houses a respective second connecting element 9.

The second component 8 has a plurality of seats 17 each of which partly houses a respective second connecting element 9.

With reference to each second connecting element 9, it is housed partly in the respective seat 16 of the first component 7 and partly in the respective seat 17 of the second component 8 of the supporting element 3.

Preferably, each second connecting element 9 comprises a cylindrical pawl 10.

The second component 8 is connected to the brake strip 2 by the first connecting elements 4.

The second component 8 of the supporting element 3 has a plurality of seats 15 each of which partly houses a respective first connecting element 4.

It should be noted that according to the embodiment illustrated, with reference to the second component 8, the seat 15 for partial housing of a respective first connecting element 4 is positioned in an alternating fashion with the seat 17 for partial housing of a respective second connecting element 9.

In an alternative embodiment, it is possible that, with reference to the second component 8, one or more seats 15 for partial housing of a respective first connecting element 4 are positioned in an alternating manner with one or more seats 17 for partial housing of a respective second connecting element 9.

The seat 15 for partial housing of a respective first connecting element 4 faces towards the brake strip 2.

The seat 17 for partial housing of a respective second connecting element 9 faces towards the first component 7.

With reference to each first connecting element 4 it is housed partly in the respective seat 14 of the brake strip 2 and partly in the respective seat 15 of the second component 8 of the supporting element 3.

Advantageously, the elastic connections are divided into at least two groups connected in series, the compliance of the connections is doubled in a radial direction and quadrupled in a direction parallel to the axis of rotation, under equal conditions of yieldable connections.

It should be noted that, with reference to rigidity in a direction parallel to the axis of rotation, a floating disc of known type with 10 connecting elements having all equal elastic constant k has a rigidity equal to Ktot=10k, the brake disc 1, according to the invention, which has 5 first connecting elements 4 all having equal elastic constant k and 5 second connecting elements 9 all having equal elastic constant k has a rigidity of 1/Ktot=1/5k+1/5k=2/5k, that is to say, Ktot=5k/2=2.5k. According to a first variant embodiment, the first connecting elements 4 allow a respective axial movement, parallel to the axis of rotation 1a of the brake disc 1, of the brake strip 2 relative to the second component 8 of the supporting element 3.

According to the first variant embodiment, the second connecting elements 9 allow a respective axial movement, parallel to the axis of rotation 1a of the brake disc 1, of the second component 8 relative to the first component 7.

According to a second variant embodiment, the first connecting elements 4 allow a respective radial movement, in an orthogonal direction relative to the axis of rotation 1a of the brake disc 1, of the brake strip 2 relative to the second component 8 of the supporting element 3.

According to the second variant embodiment, the second connecting elements 9 allow a respective radial movement, in an orthogonal direction relative to the axis of rotation 1a of the brake disc 1, of the second component 8 relative to the first component 7.

According to a third variant embodiment, the preferred embodiment, the first connecting elements 4 allow a respective radial and axial movement, relative to the axis of rotation 1a of the brake disc 1, of the brake strip 2 relative to the second component 8 of the supporting element 3 and the second connecting elements 9 allow a respective diametric and axial movement, relative to the axis of rotation 1a of the brake disc 1, of the second component 8 relative to the first component 7.

Advantageously, the presence of the first connecting elements 4, positioned between the brake strip 2 and the second component 8 of the supporting element 3, and second connecting elements 9, positioned between the second component 8 and the first component 7 of the supporting element 3, quadruples, with the same connecting elements, the compliance of the brake disc 1 in an axial direction, that is to say, in the direction of the axis of rotation 1a of the brake disc 1, and doubles, with the same connecting elements, the compliance in a radial direction, relative to the axis of rotation 1a of brake disc 1.

According to the embodiment described, the first connecting elements 4 and the second connecting elements 9 are positioned along a same circumference having as the center the axis of rotation 1a of the brake disc 1.

Advantageously, the possibility of preserving the same number of connecting elements, summing the first and second connecting elements, positioned along the same circumference of a floating brake disc of known type allows the total interchangeability of the brake disc 1 according to the invention and the floating brake disc of known type.

In order to prepare the first connecting elements 4 and the second connecting elements 9 along a same circumference, having as the center the axis of rotation 1a of the brake disc 1, the second component 8 has a plurality of lobes 12 each of which has the seat 17 which partly houses a respective second connecting element 9 and the first component 7 has a plurality of spokes 13, each of which partly houses a respective second connecting element 9 at the respective end.

Advantageously, the shape of the second component 8 makes it possible to obtain the second component 8 from the supporting element 3 starting from the same semi-worked element as the floating brake disc of known type; in this way there are no increases in the cost of the brake disc 1 for use of additional raw material.

Alternatively, it should be noted that the first connecting elements 4 and the second connecting elements 9 may be positioned along different circumferences, with reference to the axis of rotation 1a of the brake disc 1.

Lastly, it should be noted that, compared with a prior art floating disc solution, the double compliance is obtained with the same number of elastic connecting elements, with the same circumference on which all the elastic connecting elements are positioned, and therefore with the same equipment for processing the components (same tools, same programs, same equipment) and with the same equipment for assembling the discs (same assembly programs, same small parts, same assembly masks).

What is claimed is:

1. A brake disc, rotatable about an axis of rotation, comprising:
   a brake strip,
   a supporting element for supporting the brake strip,
   a plurality of first connecting elements for connecting the brake strip with the supporting element, the first connecting elements being elastically deformable to allow a relative movement of the brake strip with respect to the supporting element;
   the supporting element comprising a first component and a second component, the second component connected to the brake strip by the first connecting elements;
   a plurality of second connecting elements connecting the first component and the second component, the second connecting elements being elastically deformable to allow a relative movement between the first component and the second component; and
   wherein the first connecting elements and the second connecting elements are positioned along a same circumference having as a center, the axis of rotation of the brake disc.

2. The brake disc according to independent claim 1, wherein the first connecting elements allow a respective axial movement, parallel to the axis of rotation of the brake disc, of the brake strip relative to the second component of the supporting element.

3. The brake disc according to claim 1, wherein the second connecting elements allow a respective axial movement, parallel to the axis of rotation of the brake disc, of the second component relative to the first component.

4. The brake disc according to claim 1, wherein the first connecting elements allow a respective radial movement, relative to the axis of rotation of the brake disc, of the brake strip relative to the second component of the supporting element.

5. The brake disc according to claim 1, wherein the second connecting elements allow a respective radial movement, relative to the axis of rotation of the brake disc, of the second component relative to the first component.

6. The brake disc according to claim 1, wherein each of the first connecting elements comprises a cylindrical pawl.

7. The brake disc according to claim 1, wherein each of the second connecting elements comprises a cylindrical pawl.

8. The brake disc according to claim 1, wherein each of the second connecting elements is housed partly in a respective seat of the first component and partly in a respective seat of the second component.

9. The brake disc according to claim 8, wherein, with reference to the second component, at least one seat for partial housing of a respective one of the first connecting elements is positioned in an alternating fashion with at least one seat for partial housing of a respective one of the second connecting elements.

10. The brake disc according to claim 8, wherein the second component includes a plurality of lobes each of which has a seat which partly houses a respective one of the second connecting elements and the first component has a plurality of spokes, each of which houses partly a respective one of the second connecting elements at a respective end.

11. The brake disc according to claim 1, wherein each of the first connecting elements is housed partly in a respective seat of the brake strip and partly in a respective seat of the second component.

12. A brake disc, rotatable about an axis of rotation, comprising:
a brake strip,
a supporting element for supporting the brake strip,
a plurality of first connecting elements for connecting the brake strip with the supporting element, the first connecting elements being elastically deformable to allow a relative movement of the brake strip with respect to the supporting element;
the supporting element comprising a first component and a second component, the second component connected to the brake strip by the first connecting elements;
a plurality of second connecting elements connecting the first component and the second component, the second connecting elements being elastically deformable to allow a relative movement between the first component and the second component; and
wherein each of the second connecting elements is housed partly in a respective seat of the first component and partly in a respective seat of the second component.

13. The brake disc according to claim 12, wherein, with reference to the second component, at least one seat for partial housing of a respective one of the first connecting elements is positioned in an alternating fashion with at least one seat for partial housing of a respective one of the second connecting elements.

14. The brake disc according to claim 13, wherein the second component includes a plurality of lobes each of which has a seat which partly houses a respective one of the second connecting elements and the first component has a plurality of spokes, each of which houses partly a respective one of the second connecting elements at a respective end.

15. The brake disc according to claim 12, wherein the second component includes a plurality of lobes each of which has a seat which partly houses a respective one of the second connecting elements and the first component has a plurality of spokes, each of which houses partly a respective one of the second connecting elements at a respective end.

16. A brake disc, rotatable about an axis of rotation, comprising:
a brake strip,
a supporting element for supporting the brake strip,
a plurality of first connecting elements for connecting the brake strip with the supporting element, the first connecting elements being elastically deformable to allow a relative movement of the brake strip with respect to the supporting element;
the supporting element comprising a first component and a second component, the second component connected to the brake strip by the first connecting elements;
a plurality of second connecting elements connecting the first component and the second component, the second connecting elements being elastically deformable to allow a relative movement between the first component and the second component; and
wherein each of the first connecting elements is housed partly in a respective seat of the brake strip and partly in a respective seat of the second component.

17. The brake disc according to claim 16, wherein, with reference to the second component, at least one seat for partial housing of a respective one of the first connecting elements is positioned in an alternating fashion with at least one seat for partial housing of a respective one of the second connecting elements.

18. The brake disc according to claim 17, wherein the second component includes a plurality of lobes each of which has a seat which partly houses a respective one of the second connecting elements and the first component has a plurality of spokes, each of which houses partly a respective one of the second connecting elements at a respective end.

19. The brake disc according to claim 16, wherein the second component includes a plurality of lobes each of which has a seat which partly houses a respective one of the second connecting elements and the first component has a plurality of spokes, each of which houses partly a respective one of the second connecting elements at a respective end.

* * * * *